United States Patent
Nagao et al.

(10) Patent No.: US 9,126,846 B2
(45) Date of Patent: Sep. 8, 2015

(54) METHOD OF SYNTHESIZING METAL COMPOSITE OXIDE AND METAL COMPOSITE OXIDE OBTAINED BY SAME

(75) Inventors: Satoshi Nagao, Gotenba (JP); Kimiyasu Ono, Susono (JP); Hirohito Hirata, Sizuoka-ken (JP); Akihiko Suda, Seto (JP); Kimitoshi Sato, Inazawa (JP); Kae Yamamura, Nagoya (JP); Akira Morikawa, Nagoya (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 615 days.

(21) Appl. No.: 13/514,496

(22) PCT Filed: Dec. 6, 2010

(86) PCT No.: PCT/IB2010/003389
§ 371 (c)(1),
(2), (4) Date: Jun. 7, 2012

(87) PCT Pub. No.: WO2011/070439
PCT Pub. Date: Jun. 16, 2011

(65) Prior Publication Data
US 2012/0244056 A1    Sep. 27, 2012

(30) Foreign Application Priority Data

Dec. 8, 2009  (JP) .................................. 2009-278521
Mar. 12, 2010 (JP) .................................. 2010-056559

(51) Int. Cl.
*B01J 23/10* (2006.01)
*B01J 23/00* (2006.01)
(Continued)

(52) U.S. Cl.
CPC ............. *C01F 17/0043* (2013.01); *B82Y 30/00* (2013.01); *C01F 7/02* (2013.01); *C01F 7/34* (2013.01);
(Continued)

(58) Field of Classification Search
None
See application file for complete search history.

(56) References Cited

U.S. PATENT DOCUMENTS

2006/0043651 A1* 3/2006 Yamamoto et al. ............ 264/661
2007/0215009 A1* 9/2007 Shimazu et al. ............... 106/600

(Continued)

FOREIGN PATENT DOCUMENTS

EP    0 602 865 A1    6/1994
EP    1 175 935 A2    1/2002

(Continued)

OTHER PUBLICATIONS

International Search Report and Written Opinion for corresponding International Patent Application No. PCT/IB2010/003389 mailed Apr. 4, 2011.

(Continued)

*Primary Examiner* — Melvin C Mayes
*Assistant Examiner* — Michael Forrest
(74) *Attorney, Agent, or Firm* — Sughrue Mion, PLLC

(57) ABSTRACT

A method of synthesizing metal composite oxide, the method including: a step of separately introducing into a high-speed stirring apparatus a ceria composite oxide microparticle colloid having a mean particle diameter of 10 nm or less after adding a dispersant and an alumina microparticle colloid having a mean particle diameter of 10 nm or less after adding a dispersant; a step of synthesizing alumina-ceria composite oxide microparticles by allowing the ceria composite oxide microparticles and the alumina microparticles that have been introduced into the high-speed stirring apparatus to react in a microscopic space; and a step of applying a shearing force of 17000 sec$^{-1}$ or more to the alumina-ceria composite oxide microparticles.

4 Claims, 3 Drawing Sheets

(51) Int. Cl.
  *B01J 23/08* (2006.01)
  *C01F 17/00* (2006.01)
  *B82Y 30/00* (2011.01)
  *C01F 7/02* (2006.01)
  *C01F 7/34* (2006.01)

(52) U.S. Cl.
  CPC ......... *C01P 2004/52* (2013.01); *C01P 2004/64* (2013.01); *C01P 2004/82* (2013.01); *C01P 2006/12* (2013.01)

(56) References Cited

U.S. PATENT DOCUMENTS

| | | | |
|---|---|---|---|
| 2008/0032132 A1* | 2/2008 | Woodfield et al. | 428/402 |
| 2008/0096760 A1 | 4/2008 | Darab | |

FOREIGN PATENT DOCUMENTS

| | | |
|---|---|---|
| JP | 03-217230 A | 9/1991 |
| JP | 06-279027 A | 10/1994 |
| JP | 07-300315 A | 11/1995 |
| JP | 2005-314133 A | 11/2005 |
| JP | 4131225 B2 | 6/2008 |
| JP | 2009-090235 A | 4/2009 |
| KR | 10-2007-0094815 A | 9/2007 |
| WO | 97/07917 A1 | 3/1997 |
| WO | 2005/121025 A1 | 12/2005 |
| WO | 2011/030875 A1 | 3/2011 |

OTHER PUBLICATIONS

Japanese Office Action for corresponding JP Patent Application No. 2010-056559 issued on Oct. 28, 2011.

\* cited by examiner

METHOD OF SYNTHESIZING METAL COMPOSITE OXIDE AND METAL COMPOSITE OXIDE OBTAINED BY SAME

BACKGROUND OF THE INVENTION

1. Field of the Invention

The invention relates to a method of synthesizing a single nanometer size metal composite oxide and a metal composite oxide obtained according to that synthesis method.

2. Description of the Related Art

Growing expectations are being placed on nanotechnology in recent years, and development of materials is being actively pursued using nanocomposite materials as one of the research fields thereof. The size of the dispersed phase in composite materials according to the related art has been at most on the micron order, and performance able to be predicted therefrom has only been on the level that is able to be predicted with compounding rules. However, in the case of nanocomposite materials, quantum size effects appear that differ from those of bulk materials, and since interatomic or intermolecular interactions have a considerable effect on material properties and the interface with the matrix increases dramatically, functions are expected to be demonstrated that far surpass those of composite materials according to the related art.

Here, nanometer size typically refers to a size of 1 nm to several tens of nm. In contrast, single nanometer size, which has recently attracted attention, refers to a size of 1 nm to 10 nm, and microparticles having such a size have a larger quantum size effect than microparticles having a size of several tens of nm and are expected to have the effect of demonstrating functions as a novel material.

Several technologies for producing metal composite oxide microparticles, including their applications, are available. Japanese Patent Application Publication No. 2009-090235 (JP-A-2009-090235) discloses a catalyst material for purifying exhaust gas components having mutually mixing primary particles of active alumina and primary particles of a composite oxide containing Ce, Zr and a rare earth metal R other than Ce, and aggregating the primary particles so as to form secondary particles, wherein $CeO_2$ is contained in the primary particles of the composite oxide at a ratio of 20 to 60 mol %.

This catalyst material for purifying exhaust gas components is composed of secondary particles obtained by aggregating primary particles. The size of microparticles formed by such secondary aggregation far exceeds several tens of nm, and such microparticles are therefore not microparticles having a single nanometer size.

SUMMARY OF THE INVENTION

The invention provides a method of synthesizing a metal composite oxide of the single nanometer size, and a metal composite oxide obtained according to that synthesis method.

In a first aspect thereof, the invention relates to a method of synthesizing a metal composite oxide that includes: adding a dispersant to a ceria composite oxide microparticle colloid; adding a dispersant to an alumina microparticle colloid; introducing separately the ceria composite oxide microparticle colloid to which the dispersant has been added and the alumina microparticle colloid to which the dispersant has been added into a high-speed stirring apparatus; synthesizing alumina-ceria composite oxide microparticles by allowing the ceria composite oxide microparticles and the alumina microparticles that have been introduced into the high-speed stirring apparatus to mutually react in a microscopic space; and applying a shearing force of 17000 $sec^{-1}$ or more to the alumina-ceria composite oxide microparticles. In this synthesis method, the mean particle diameter of the ceria composite oxide microparticle colloid to which the dispersant has been added and the mean particle diameter of the alumina microparticle colloid to which the dispersant has been added are both 10 nm or less.

According to the above configuration, single nanometer size metal composite oxide microparticles can be synthesized from two different single nanometer size microparticle colloids consisting of the ceria composite oxide microparticle colloid and the alumina microparticle colloid. In addition, a method of synthesizing a metal composite oxide having such a configuration enables single nanometer size metal composite oxide microparticles to be synthesized that have a more uniform composition than methods according to the related art as a result of uniformly mixing and stirring with the high-speed stirring apparatus.

In the synthesis method according to this aspect, the pH value of a solution containing the alumina-ceria composite oxide microparticles to which shearing force has been applied may be a pH value at which the alumina-ceria composite oxide microparticles maintain a mean particle diameter of 10 nm or less.

According to the above configuration, by setting the pH to an optimum pH value, the resulting metal composite oxide microparticles are able to maintain the single nanometer size without causing mutual aggregation.

In the synthesis method according to this aspect, the pH value of a solution containing the alumina-ceria composite oxide microparticles to which shearing force has been applied may be within the range of 0.5 to 1.5, may be within the range of 0.5 to 1.2, or may be within the range of 0.8 to 1.2.

In a second aspect thereof, the invention relates to a metal composite oxide synthesized according to a synthesis method that includes: adding a dispersant to a ceria composite oxide microparticle colloid, adding a dispersant to an alumina microparticle colloid, separately introducing the ceria composite oxide microparticle colloid to which the dispersant has been added and the alumina microparticle colloid to which the dispersant has been added into a high-speed stirring apparatus, synthesizing alumina-ceria composite oxide particles by allowing the ceria composite oxide microparticles and the alumina microparticles that have been introduced into the high-speed stirring apparatus to mutually react in a microscopic space, and applying a shearing force of 17000 $sec^{-1}$ or more to the alumina-ceria composite oxide microparticles. The mean particle diameter of the ceria composite oxide microparticle colloid to which the dispersant has been added and the mean particle diameter of the alumina microparticle colloid to which the dispersant has been added are both 10 nm or less.

According to the above configuration, a metal composite oxide can be obtained that has a larger specific surface area than a metal composite oxide produced with a coprecipitation method or mixing and stirring method according to the related art.

The metal composite oxide according to this aspect may have a pH value within the range of 0.5 to 1.5.

According to the invention, single nanometer size metal composite oxide microparticles can be synthesized from two different single nanometer size microparticle colloids consisting of the ceria composite oxide microparticle colloid and the alumina microparticle colloid. In addition, according to the invention, single nanometer size metal composite oxide microparticles can be synthesized that have a more uniform composition than methods according to the related art as a result of uniformly mixing and stirring with the high-speed stirring apparatus.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
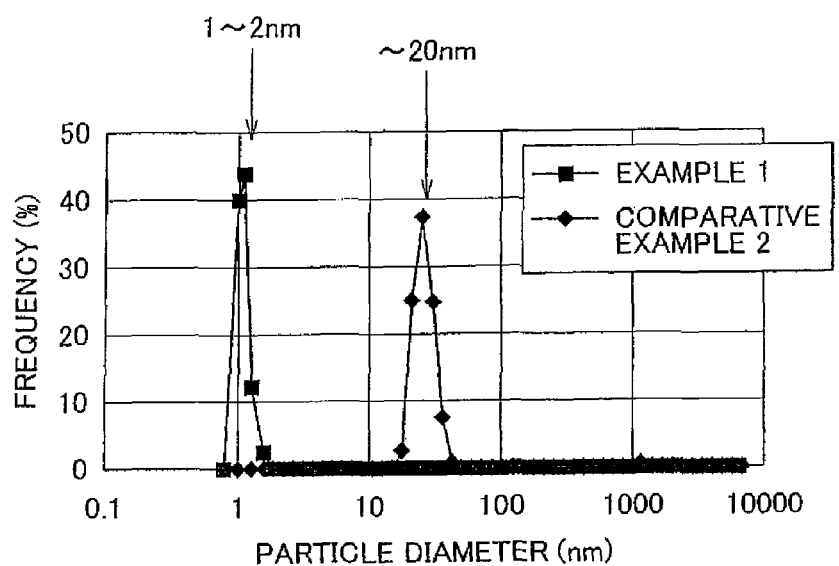
FIG. 1 is a graph showing the particle size distributions of metal composite oxide microparticle colloids of Example 1 and Comparative Example 2.

The method of synthesizing a metal composite oxide according to a first embodiment of the invention has a step for separately introducing a ceria composite oxide microparticle colloid having a mean particle diameter of 10 nm or less after adding a dispersant and an alumina microparticle colloid having a mean particle diameter of 10 nm or less after adding a dispersant into a high-speed stirring apparatus, a step for synthesizing alumina-ceria composite oxide microparticles by allowing the ceria composite oxide microparticles and the alumina microparticles that have been introduced into the high-speed stirring apparatus to react in a microscopic space, and a step for applying a shearing force of 17000 $\sec^{-1}$ or more to the alumina-ceria composite oxide microparticles.

Normally, in the case of mixing different single nanometer size primary particles as is, it is difficult to hold the particle diameter of the microparticles obtained as a result of mixing to the single nanometer size due to the occurrence of aggregation among the primary particles. As a result of conducting studies on the cause of the occurrence of this aggregation, the inventors of the invention found that mixing was not uniform in the methods according to the related art, and that studies had not been conducted on those conditions, and particularly pH, required for obtaining microparticles of the single nanometer size as a result of mixing. As a result of considerable efforts on the part of the inventors of the invention, a method of uniformly mixing particles of the single nanometer size and pH conditions following mixing were found, thereby leading to completion of the method of synthesizing metal composite oxide according to the invention.

The method of synthesizing metal composite oxide of this embodiment has a step for introducing two different microparticle colloids into a high-speed stirring apparatus, a step for allowing the two different microparticles to react in a microscopic space, and a step for applying a shearing force to the microparticles following the reaction. The following provides a detailed explanation of these three steps of the embodiment.

A first step of the method of synthesizing metal composite oxide according to this embodiment as the step for introducing two different microparticle colloids into a high-speed stirring apparatus is a step in which a ceria composite oxide microparticle colloid having a mean particle diameter after adding a dispersant of 10 nm or less, and an alumina microparticle colloid having a mean particle diameter after adding a dispersant of 10 nm or less are separately introduced into a high-speed stirring apparatus.

There are no particular limitations on the "high-speed stirring apparatus" as referred to in this embodiment provided it is at least provided with a mechanism enabling two or more different microparticle colloids or solutions thereof to be separately introduced therein (which may also be referred to as an introduction mechanism), a reaction chamber in which the two or more different microparticle colloids are allowed to react, and a mechanism for applying a prescribed shearing force to the synthesized metal composite oxide microparticles (which may also be referred to as a "shearing mechanism").

An example of the configuration of the introduction mechanism specifically consists of an apparatus capable of independently supplying two or more different microparticle colloids or solutions thereof, and a nozzle for transporting a raw material solution supplied from the solution supplying apparatus to the reaction chamber. There are no particular limitations on the reaction chamber provided it has a microscopic space where the different microparticle colloids are allowed to react. Here, the "microscopic space" refers to a space that has sufficient volume for allowing the obtaining of alumina-ceria composite oxide microparticles by reacting at least one of the ceria composite oxide microparticles and at least one of the alumina microparticles. More specifically, the reaction chamber may be a space that is sealed with the exception of an introduction path for microparticles that are the raw materials and a discharge path for microparticles that are the target product, and has a volume of at least several cubic nanometers to several cubic micrometers. A specific example of the shearing mechanism is a high-speed stirring apparatus. A specific example of the high-speed stirring apparatus is a homogenizer provided with a rotor capable of rotating at high speed and a stator. The rotating speed of the rotor may be variable and at least the stirring rotating speed of the rotor may be set to 3200 rpm or higher (equivalent to a shearing speed of 17000 $\sec^{-1}$).

There are no particular limitations on the ceria composite oxide able to be used in this step provided it is a compound that at least contains elementary cerium (Ce), elementary oxygen and other elements. In this case, examples of the other elements that can be used include rare earth elements such as scandium or yttrium and group 4 elements such as titanium, zirconium or hafnium. Specific examples of ceria composite oxides include ceria-zirconia-yttria composite oxide ($CeO_2$—$ZrO_2$—$Y_2O_3$), $CeO_2$—$ZrO_2$—$Pr_2O_3$, $CeO_2$—$ZrO_2$—$La_2O_3$—$Y_2O_3$ and $CeO_2$—$ZrO_2$—$La_2O_3$-$Y_2O_3$—$Nd_2O_3$.

The following provides a detailed description of a typical example of a method of preparing a ceria-zirconia-yttria composite oxide having a mean particle diameter of 10 nm or less after adding a dispersant that can be used in this step. Furthermore, this preparation method is not necessarily limited to this typical example only, but rather a method differing from this typical method may be used provided it is a preparation method that allows the obtaining of a ceria-zirconia-yttria composite oxide having a mean particle diameter of 10 nm or less after adding a dispersant as a result thereof. First, a solution having cerium ions, a solution having zirconium ions and a solution having yttrium ions are respectively prepared for use as raw material solutions. Furthermore, although there are no particular limitations on the solvent in the case of referring to a "solution" in the subsequent description, and an example thereof is an aqueous solution that uses water and the like as solvent. Specific examples of the solution having cerium ions include cerium acetate solution, cerium nitrate solution, cerium chloride solution, cerium oxalate solution, cerium citrate solution and diammonium cerium (IV) nitrate solution $((NH_4)_2Ce(NO_3)_6)$. Specific examples of the solution having zirconium ions include zirconium oxyacetate solution, zirconium oxynitrate solution, zirconium oxychloride solution, zirconium oxalate solution and zirconium citrate solution. Specific examples of the solution having yttrium ions include yttrium acetate solution, yttrium nitrate solution, yttrium chloride solution, yttrium oxalate solution and yttrium citrate solution. Next, the solution having cerium ions, the solution having zirconium ions and the solution having yttrium ions are mixed and stirred with a dispersant, neutralizer, pH adjuster and the like to prepare a ceria-zirconia-yttria composite oxide solution having a mean particle diameter of 10 nm or less. Furthermore, the above-mentioned high-speed stirring apparatus can also be used for this mixing and stirring. Examples of the dispersant able to be used at this time include amine-based dispersants such as polyethyleneimine (PEI) or polyvinylpyrrolidone, hydrocarbon-based polymer dispersants having a carboxyl group in a molecule thereof such as polyacrylic acid or carboxymethyl cellulose, poval (polyvinyl alcohol) and polymer dispersants having a polar group such as copolymers having a PEI moiety and a polyethylene oxide moiety in a molecule thereof. In addition, the molecular weight thereof may be 100,000 or less. Although there are no particular limitations on the neutralizer able to be used at this time provided it is an inorganic salt solution, inorganic acid or inorganic base, specific examples include ammonium acetate or an aqueous solution thereof, ammonium nitrate or an aqueous solution thereof, aqueous hydrogen peroxide, ammonia or an aqueous solution thereof, ammonium chloride or an aqueous solution thereof, sodium hydroxide or an aqueous solution thereof, potassium hydroxide or an aqueous solution thereof, hydrochloric acid, oxalic acid, citric acid and mixtures thereof. In addition, although there are no particular limitations on the pH adjuster able to be used at this time provided it is an inorganic acid or inorganic base, specific examples include acetic acid, nitric acid and mixtures thereof. Furthermore, pH may be adjusted by preliminarily mixing the pH adjuster with the neutralizer. Whether the ceria composite oxide microparticle colloid prepared in this manner and to which a dispersant has been added actually has a mean particle diameter of 10 nm or less can be confirmed by using a particle size distribution measuring apparatus by dynamic light scattering.

Although there are no particular limitations on the method used to produce the alumina microparticle colloid having a mean particle diameter of 10 nm or less after adding a dispersant, an example of such a method consists of mixing and stirring a solution having aluminum ions used as a raw material solution with a dispersant, neutralizer, pH adjuster and the like. Furthermore, the above-mentioned high-speed stirring apparatus can also be used for this mixing and stirring. Examples of the solution having aluminum ions able to be used at this time include aluminum nitrate solution, aluminum chloride solution, aluminum acetate solution, aluminum oxalate solution and aluminum citrate solution. The previously listed examples of dispersants, neutralizers and pH adjusters can be used for the dispersant, neutralize and pH adjuster able to be used at this time. Furthermore, pH may be adjusted by preliminarily mixing the pH adjuster with the neutralizer. Whether the alumina microparticle colloid prepared in this manner and to which a dispersant has been added actually has a mean particle diameter of 10 nm or less can be confirmed by using a particle size distribution measuring apparatus by dynamic light scattering.

A second step of the method of synthesizing the metal composite oxide according to this embodiment as the step for reacting two different microparticles in a microscopic space is a step in which the ceria composite oxide microparticles and the alumina microparticles introduced into the high-speed stirring apparatus are allowed to react in a microscopic space. Here, the "microscopic space" refers to a microscopic space within the high-speed stirring apparatus. Furthermore, the reaction time may be 0.1 to 10 milliseconds, and the reaction temperature may be 15 to 40° C.

A third step of the method of synthesizing the metal composite oxide according to this embodiment as the step for applying shearing force to the microparticles following the reaction is a step in which a shearing force of 17000 sec$^{-1}$ or more is applied to the metal composite oxide microparticle colloid obtained following the reaction step described above. Although there are no particular limitations on the method by which the shearing force is applied, a specific example thereof consists of stirring with the high-speed stirring mechanism within the high-speed stirring apparatus described above.

Following the step for applying shearing force, the pH value of the solution containing alumina-ceria composite oxide microparticles may be a pH value that enables the alumina-ceria composite oxide microparticles to maintain a mean particle diameter of 10 nm or less. As a result of setting the pH to an optimum pH value in this manner, the resulting metal composite oxide microparticles can be maintained at the single nanometer size without causing mutual aggregation thereof.

More specifically, the pH value of the solution containing alumina-ceria composite oxide microparticles following the step for applying shearing force may be within the range of 0.5 to 1.5. If this pH value is lower than 0.5, it becomes difficult to synthesize alumina-ceria composite oxide microparticles having a mean particle diameter of 10 nm or less mainly due to the aggregation of PEI under strongly acidic conditions. In addition, if the pH value exceeds 1.5, it becomes difficult to maintain a mean particle diameter of 10 nm or less for an extended period of time due to the low stability of the alumina-ceria composite oxide microparticles as indicated in the subsequent examples. There are no particular limitations on the method used to adjust the pH. A specific example of a method of adjusting the pH consists of preliminarily adding the above-mentioned neutralizer and/or pH adjuster to the alumina single nanoparticle colloid and/or ceria composite oxide single nanoparticle colloid prior to mixing. Following the step for applying shearing force, the pH value of the solution containing the alumina-ceria composite oxide microparticles may preferably within the range of 0.5 to 1.2 and more preferably within the range of 0.8 to 1.2.

The metal composite oxide of this embodiment is synthesized according to the previously described synthesis method.

As was previously described, a single nanometer size metal composite oxide can be obtained according to the method of synthesizing metal composite oxide according to this embodiment. Such a single nanometer size metal composite oxide is expected to demonstrate various physical properties. In particular, as indicated in the subsequent examples, the specific surface area of the metal composite oxide according to this embodiment was found for the first time to be larger than the specific surface area of a composite oxide obtained by a stirring and mixing method according to the related art. Furthermore, from the viewpoint of being able to maintain a mean particle diameter of 10 nm or less for an extended period of time, the metal composite oxide of this embodiment may have a pH value within the range of 0.5 to 1.5.

EXAMPLE 1

First, alumina single nanoparticles were synthesized for synthesizing a metal composite oxide. The raw material solution consisted of using aluminum nitrate ($Al(NO_3)_3 \cdot 9H_2O$) (Wako Pure Chemical Industries, Ltd.) as a starting raw material followed by preparing an aqueous solution of this starting raw material. In addition, a neutralizer/dispersant mixture was prepared in which PEI (Wako Pure Chemical Industries, Ltd.) was added as dispersant to ammonium nitrate solution ($NH_4NO_3$) (Wako Pure Chemical Industries, Ltd.) as neutralizer. The pH was adjusted by adding nitric acid to the neutralizer/dispersant mixture. An $Al_2O_3$ particle colloid was obtained by mixing and stirring the raw material solution and the neutralizer/dispersant mixture with a high-speed stirring apparatus. Monodispersed single nanoparticles having a particle diameter of 2.3±0.7 nm were confirmed to be formed in this colloid with a particle size distribution measuring apparatus by dynamic light scattering (ELS-Z, Otsuka Electronics Co., Ltd.). This high-speed stirring apparatus was composed of a high-speed stirring mechanism, a nozzle and a solution supplying apparatus, the high-speed stirring mechanism consisted of a homogenizer provided with a rotor capable of rotating at high speed and a stator, the nozzle was arranged in the area of high-speed stirring and had a function that enabled the raw material solution and the neutralizer/dispersant mixture to be introduced independently, and the solution supplying apparatus was connected to the nozzle.

Next, ceria-zirconia-yttria composite single nanoparticles were synthesized. The raw material solution consisted of using cerium acetate ($Ce(CH_3CO_2)_2 \cdot H_2O$) (Kishida Chemical Co., Ltd.), zirconium oxyacetate ($ZrO(CH_3CO_2)_2$) (Kishida Chemical Co., Ltd.) and yttrium acetate ($Y(CH_3CO_2)_3 \cdot 4H_2O$) (Wako Pure Chemical Industries, Ltd.) as starting raw materials followed by preparing a mixed aqueous solution of the starting raw materials. In addition, a neutralizer/dispersant mixture was prepared in which PEI and aqueous hydrogen peroxide ($H_2O_2$) (Wako Pure Chemical Industries, Ltd.) as dispersants were added to ammonium acetate solution ($CH_3CO_2NH_4$) (Wako Pure Chemical Industries, Ltd.) as neutralizer. The pH was adjusted by adding acetic acid to the neutralizer/dispersant mixture. A ceria-zirconia-yttria composite single nanoparticle colloid was obtained by mixing and stirring the raw material solution and the neutralizer/dispersant mixture with a high-speed stirring apparatus. Monodispersed single nanoparticles having a particle diameter of 2.1±0.6 nm were confirmed to be formed in this colloid with a particle size distribution measuring apparatus by dynamic light scattering.

Continuing, after preparing a required amount of a colloid such that the mass ratio of alumina single nanoparticles to ceria-zirconia-yttria composite single nanoparticles as particles is 1:1, the resulting colloid was mixed with the high-speed stirring apparatus. The speeds at which the solution containing the alumina single nanoparticles and the solution containing the ceria-zirconia-yttria composite single nanoparticles were supplied were 2.5 mL/min each. In addition, stirring rotating speed was 3200 rpm. This rotating speed is equivalent to a shearing speed of 17000 $sec^{-1}$. The PEI was decomposed by incrementally heating the mixed colloid to 400° C. followed by baking under conditions of 1000° C. for 5 hours to obtain a powder sample.

EXAMPLE 2

Synthesis of the alumina single nanoparticles was carried out in the same manner as the above-mentioned Example 1. Next, ceria-zirconia-yttria composite single nanoparticles were synthesized. The raw material solution consisted of using diammonium cerium (IV) nitrate ($(NH_4)_2Ce(NO_3)_6$) (Wako Pure Chemical Industries, Ltd.), zirconium oxynitrate dihydrate ($ZrO(NO_3)_2 \cdot 2H_2O$) (Wako Pure Chemical Industries, Ltd.) and yttrium nitrate hexahydrate ($Y(NO_3)_3 \cdot 6H_2O$) (Kanto Chemical Co., Inc.) as starting raw materials followed by preparing a mixed aqueous solution of the starting raw materials. In addition, a neutralizer/dispersant mixture was prepared in which PEI as dispersant was added to ammonium nitrate solution as neutralizer. The pH was adjusted by adding nitric acid to the neutralizer/dispersant mixture. A ceria-zirconia-yttria composite single nanoparticle colloid was obtained by mixing and stirring the raw material solution and the neutralizer/dispersant mixture with a high-speed stirring apparatus. This ceria-zirconia-yttria composite single nanoparticle colloid was confirmed to be of the single nanometer size with a particle size distribution measuring apparatus by dynamic light scattering. Moreover, after preparing a required amount of a colloid such that the mass ratio of alumina single nanoparticles to ceria-zirconia-yttria composite single nanoparticles as particles was 1:1 and adjusting the pH so that the pH of the colloidal solution after mixing was 1.5, the resulting colloid was mixed and stirred in the same manner as Example 1. Subsequently, baking was carried out in the same manner as Example 1 to obtain a powder sample.

EXAMPLE 3

Synthesis of the alumina single nanoparticles was carried out in the same manner as the above-mentioned Example 1. Synthesis of ceria-zirconia-yttria composite single nanoparticles was carried out in the same manner as Example 2. After preparing a required amount of a colloid such that the mass ratio of alumina single nanoparticles to ceria-zirconia-yttria composite single nanoparticles as particles was 1:1 and adjusting the pH so that the pH of the colloidal solution after mixing was 1.2 by preliminarily adding nitric acid to the alumina single nanoparticle colloid, the resulting colloid was mixed and stirred in the same manner as Example 1. Subsequently, baking was carried out in the same manner as Example 1 to obtain a powder sample.

EXAMPLE 4

Synthesis of the alumina single nanoparticles was carried out in the same manner as the above-mentioned Example 1. Synthesis of ceria-zirconia-yttria composite single nanoparticles was carried out in the same manner as Example 2. After preparing a required amount of a colloid such that the mass ratio of alumina single nanoparticles to ceria-zirconia-yttria composite single nanoparticles as particles was 1:1 and adjusting the pH so that the pH of the colloidal solution after mixing was 1.0 by preliminarily adding nitric acid to the alumina single nanoparticle colloid, the resulting colloid was mixed and stirred in the same manner as Example 1. Subsequently, baking was carried out in the same manner as Example 1 to obtain a powder sample.

EXAMPLE 5

Synthesis of the alumina single nanoparticles was carried out in the same manner as the above-mentioned Example 1. Synthesis of ceria-zirconia-yttria composite single nanoparticles was carried out in the same manner as Example 2. After preparing a required amount of a colloid such that the mass ratio of alumina single nanoparticles to ceria-zirconia-yttria composite single nanoparticles as particles was 1:1 and adjusting the pH so that the pH of the colloidal solution after mixing was 0.8 by preliminarily adding nitric acid to the alumina single nanoparticle colloid, the resulting colloid was mixed and stirred in the same manner as Example 1. Subsequently, baking was carried out in the same manner as Example 1 to obtain a powder sample.

EXAMPLE 6

Synthesis of the alumina single nanoparticles was carried out in the same manner as the above-mentioned Example 1. Synthesis of ceria-zirconia-yttria composite single nanoparticles was carried out in the same manner as Example 2. After preparing a required amount of a colloid such that the mass ratio of alumina single nanoparticles to ceria-zirconia-yttria composite single nanoparticles as particles was 1:1 and adjusting the pH so that the pH of the colloidal solution after mixing was 0.5 by preliminarily adding nitric acid to the alumina single nanoparticle colloid, the resulting colloid was mixed and stirred in the same manner as Example 1. Subsequently, baking was carried out in the same manner as Example 1 to obtain a powder sample.

COMPARATIVE EXAMPLE 1

A metal composite oxide was synthesized in accordance with the coprecipitation method according to the related art. A mixed solution was prepared as a raw material solution by mixing aluminum nitrate, cerium nitrate, zirconium oxynitrate and yttrium nitrate. Aqueous ammonia as neutralizer was added to and mixed with the raw material solution to form composite precipitate particles. When the particle diameter of the precipitate particles was confirmed with a particle size distribution measuring apparatus by dynamic light scattering, the particle diameter was found to be distributed over a wide range of 0.1 to 10 μm. The supernatant was then removed by applying the raw material solution to a centrifugal separator. Ion exchange water was further added to the dehydrated precipitate from which the supernatant had been removed followed by stirring and again removing the supernatant by applying to the centrifugal separator, and this washing and dehydrating procedure was repeated several times. After drying the dehydrated precipitate, it was baked under conditions of 1000° C. for 5 hours to obtain a powder sample.

COMPARATIVE EXAMPLE 2

Synthesis of alumina single nanoparticles and synthesis of ceria-zirconia-yttria composite single nanoparticles were carried out in the same manner as Example 1. These two types of colloids were independently introduced into a beaker using a solution supplying apparatus. The colloids present in the beaker were mixed with a stirrer and stirring was continued for 5 hours following completion of introduction of the colloidal solutions. At this time, the stirrer rotating speed was 2000 rpm. The colloidal solutions were incrementally heated to 400° C. following completion of stirring to decompose PEI, followed by baking under conditions of 1000° C. for 5 hours to obtain a powder sample.

COMPARATIVE EXAMPLE 3

Synthesis of alumina single nanoparticles was carried out in the same manner as Example 1, while synthesis of ceria-zirconia-yttria composite single nanoparticles was carried out in the same manner as Example 2. After preparing a required amount of a colloid such that the mass ratio of alumina single nanoparticles to ceria-zirconia-yttria composite single nanoparticles as particles was 1:1 and adjusting the pH so that the pH of the colloidal solution after mixing was 3.5 by preliminarily adding nitric acid to the alumina single nanoparticle colloid, the resulting colloid was mixed and stirred in the same manner as Example 1. Subsequently, baking was carried out in the same manner as Example 1 to obtain a powder sample.

COMPARATIVE EXAMPLE 4

Synthesis of alumina single nanoparticles was carried out in the same manner as Example 1, while synthesis of ceria-zirconia-yttria composite single nanoparticles was carried out in the same manner as Example 2. After preparing a required amount of a colloid such that the mass ratio of alumina single nanoparticles to ceria-zirconia-yttria composite single nanoparticles as particles was 1:1 and adjusting the pH so that the pH of the colloidal solution after mixing was 3.0 by preliminarily adding nitric acid to the alumina single nanoparticle colloid, the resulting colloid was mixed and stirred in the same manner as Example 1. Subsequently, baking was carried out in the same manner as Example 1 to obtain a powder sample.

COMPARATIVE EXAMPLE 5

Synthesis of alumina single nanoparticles was carried out in the same manner as Example 1, while synthesis of ceria-zirconia-yttria composite single nanoparticles was carried out in the same manner as Example 2. After preparing a required amount of a colloid such that the mass ratio of alumina single nanoparticles to ceria-zirconia-yttria composite single nanoparticles as particles was 1:1 and adjusting the pH so that the pH of the colloidal solution after mixing was 2.0 by preliminarily adding nitric acid to the alumina single nanoparticle colloid, the resulting colloid was mixed and stirred in the same manner as Example 1. Subsequently, baking was carried out in the same manner as Example 1 to obtain a powder sample.

COMPARATIVE EXAMPLE 6

Synthesis of alumina single nanoparticles was carried out in the same manner as Example 1, while synthesis of ceria-zirconia-yttria composite single nanoparticles was carried out in the same manner as Example 2. After preparing a required amount of a colloid such that the mass ratio of alumina single nanoparticles to ceria-zirconia-yttria composite single nanoparticles as particles was 1:1 and adjusting the pH so that the pH of the colloidal solution after mixing was 1.8 by preliminarily adding nitric acid to the alumina single nanoparticle colloid, the resulting colloid was mixed and stirred in the same manner as Example 1. Subsequently, baking was carried out in the same manner as Example 1 to obtain a powder sample.

COMPARATIVE EXAMPLE 7

Synthesis of alumina single nanoparticles was carried out in the same manner as Example 1, while synthesis of ceria-zirconia-yttria composite single nanoparticles was carried out in the same manner as Example 2. After preparing a required amount of a colloid such that the mass ratio of alumina single nanoparticles to ceria-zirconia-yttria composite single nanoparticles as particles was 1:1 and adjusting the pH so that the pH of the colloidal solution after mixing was 1.6 by preliminarily adding nitric acid to the alumina single nanoparticle colloid, the resulting colloid was mixed and stirred in the same manner as Example 1. Subsequently, baking was carried out in the same manner as Example 1 to obtain a powder sample.

COMPARATIVE EXAMPLE 8

Synthesis of alumina single nanoparticles was carried out in the same manner as Example 1, while synthesis of ceria-zirconia-yttria composite single nanoparticles was carried out in the same manner as Example 2. After preparing a required amount of a colloid such that the lmass ratio of alumina single nanoparticles to ceria-zirconia-yttria composite single nanoparticles as particles was 1:1 and adjusting the pH so that the pH of the colloidal solution after mixing was 0.3 by preliminarily adding nitric acid to the alumina single nanoparticle colloid, the resulting colloid was mixed and stirred in the same manner as Example 1. Subsequently, baking was carried out in the same manner as Example 1 to obtain a powder sample.

In order to compare the specific surface areas of the metal composite oxide microparticles, the pore size distributions of the metal composite oxide microparticles of Example 1, Comparative Example 1 and Comparative Example 2 were measured by nitrogen adsorption followed by calculation of their specific surface areas. Table 1 summarizes the specific surface areas of these metal composite oxide microparticles.

TABLE 1

|  | Specific Surface Area ($m^2/g$) |
| --- | --- |
| Example 1 | 141 |
| Comparative Example 1 | 66.1 |
| Comparative Example 2 | 101 |

As indicated in Table 1, the specific surface area of metal composite oxide microparticles synthesized in accordance with the coprecipitation method according to the related art (Comparative Example 1) was 66.1 $mg^2/g$, while the specific surface area of metal composite oxide microparticles synthesized in accordance with the stirrer mixing method according to the related art (Comparative Example 2) was 101 $m^2/g$. In contrast thereto, the specific surface area of the metal composite oxide microparticles obtained according to the synthesis method of this embodiment (Example 1) was 141 $m^2/g$. On the basis of these results, the metal composite oxide microparticles according to the embodiment were determined to constitute a novel material having a larger specific surface area than the metal composite oxide microparticles according to the related art.

Particle size distribution was measured for the metal composite oxide microparticle colloid of Example 1 measured for particle size distribution and the metal composite oxide microparticle colloids of Comparative Examples 2 to 4. Particle size distributions were measured with a particle size distribution measuring apparatus by dynamic light scattering. FIG. 1 is a graph showing the particle size distributions of metal composite oxide microparticle colloids of Example 1 and Comparative Example 2. As is clear from this graph, in contrast to the mean particle diameter of the metal composite oxide microparticle colloid produced using the stirrer mixing method according to the related art (Comparative Example 2) being about 20 nm, the mean particle diameter of the metal composite oxide microparticle colloid obtained according to the synthesis method of the embodiment (Example 1) was 1 to 2 nm. On the basis of these results, the synthesis method according to the embodiment was clearly determined to allow the synthesis of novel single nanometer size microparticles by reacting two or more types of single nanometer size particles, which was difficult with methods according to the related art.

Figure 3:
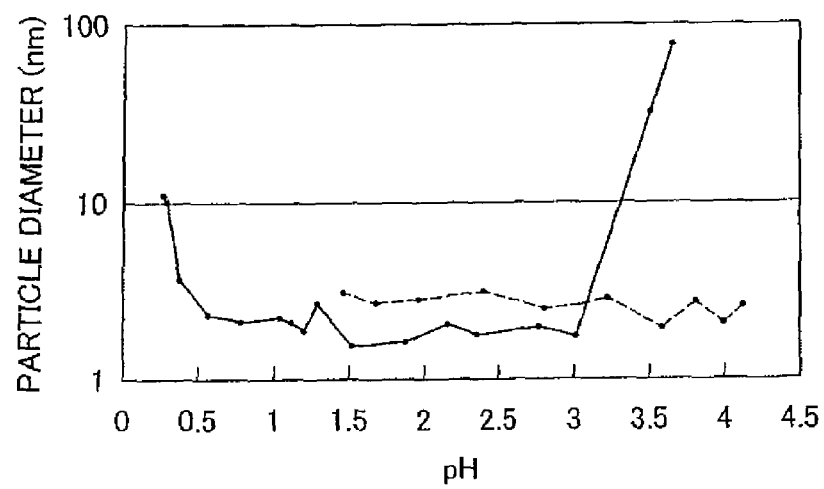
FIG. 3 is a graph in which particle diameter values are plotted on the vertical axis and pH is plotted on the horizontal axis in which the solid line shows the particle diameter of ceria-zirconia-yttria composite single nanoparticles, while the broken line shows the particle diameter of alumina single nanoparticles.
Figure 4:
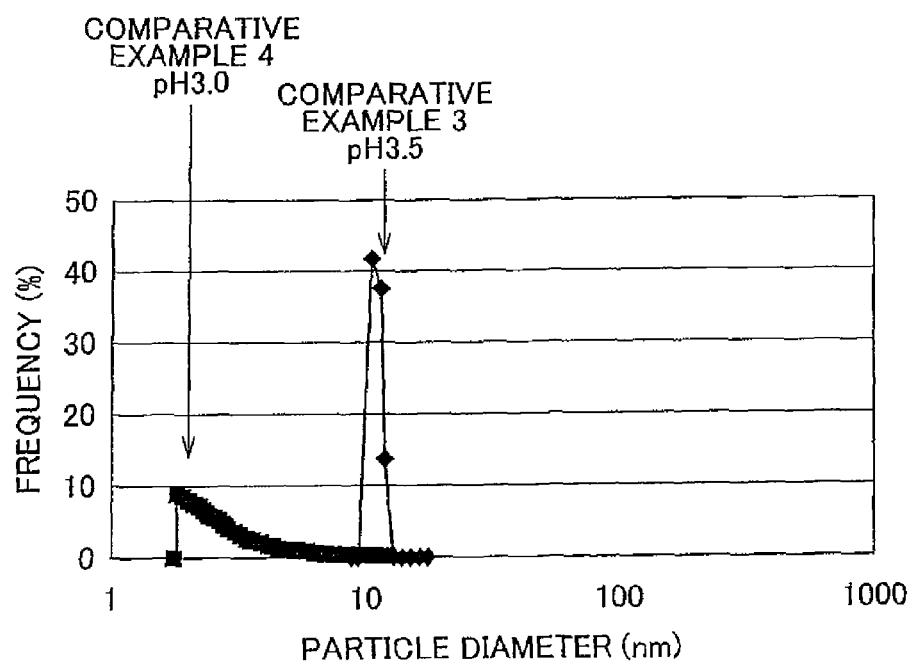
FIG. 4 is a graph showing the particle size distributions of metal composite oxide microparticle colloids of Comparative Example 3 and Comparative Example 4.

FIG. 4 is a graph showing the particle size distributions of metal composite oxide microparticle colloids of Comparative Example 3 and Comparative Example 4. As can be seen from this graph, in contrast to the mean particle diameter of the metal composite oxide microparticle colloid in which the pH after mixing and stirring is 3.5 (Comparative Example 3) being about 10 nm, the mean particle diameter of the metal composite oxide microparticle colloid in which the pH after mixing and stirring was 3.0 (Comparative Example 4) was 1.8 nm. This result is thought to be based on the ease of aggregation of each of the raw material alumina single nanoparticles and the ceria-zirconia-yttria composite single nanoparticles differing according to the pH. FIG. 3 is a graph in which particle diameter values are plotted on the vertical axis and pH is plotted on the horizontal axis in which the solid line shows the particle diameter of ceria-zirconia-yttria composite single nanoparticles, while the broken line shows the particle diameter of alumina single nanoparticles. As can be seen from these plots, although the particle diameter of the alumina single nanoparticles does not fluctuate that much according to pH, the particle diameter of the ceria-zirconia-yttria composite single nanoparticles increased rapidly particularly over a range in which the pH exceeds 3.

Figure 5:
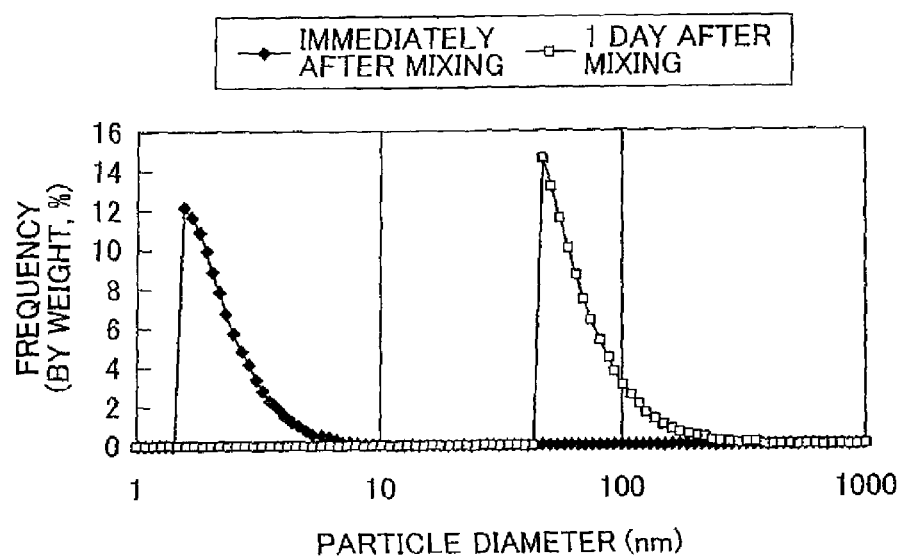
FIG. 5 is a graph showing the particle size distribution of a metal composite oxide microparticle colloid in which the pH after mixing and stirring is 3.0 (Comparative Example 4)
Figure 6:
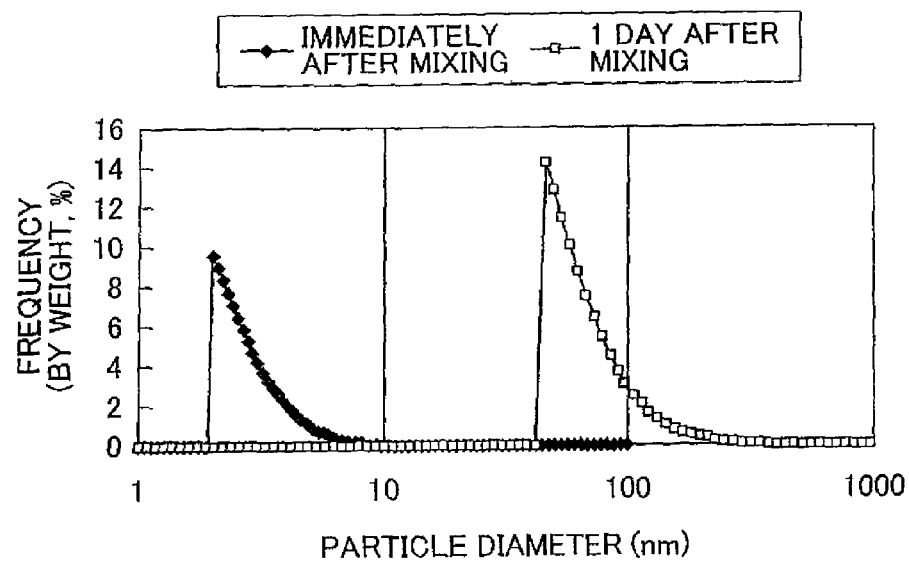
FIG. 6 is a graph showing the particle size distribution of a metal composite oxide microparticle colloid in which the pH after mixing and stirring is 2.0 (Comparative Example 5).

Time-based changes in particle diameter were investigated for the metal composite oxide nanoparticles of Examples 2 to 6 and Comparative Examples 4 to 8 in order to investigate changes in particle diameter of metal composite oxide microparticles. Particle diameter was measured with a particle size distribution measuring apparatus by dynamic light scattering. FIG. 5 is a graph showing the particle size distribution of a metal composite oxide microparticle colloid in which the pH after mixing and stirring was 3.0 (Comparative Example 4). FIG. 6 is a graph showing the particle size distribution of a metal composite oxide microparticle colloid in which the pH after mixing and stirring was 2.0 (Comparative Example 5). In both of these graphs, the black diamonds indicate particle size distribution immediately after mixing, while the white squares indicate particle size distribution after one day had elapsed after mixing. As can be seen from the graphs, both the metal composite oxide microparticle colloids of Comparative Examples 4 and 5 retained mean particle diameters of 10 nm or less immediately after mixing. However, aggregation occurred in both of the metal composite oxide microparticle colloids one day after mixing, and their mean particle diameters increased to 40 nm or more.

Figure 2:
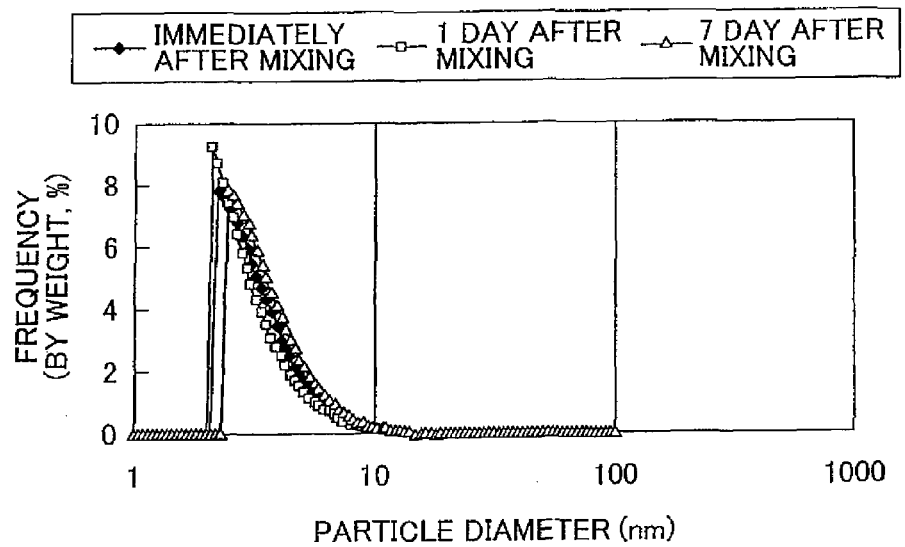
FIG. 2 is a graph showing the particle size distribution of a metal composite oxide microparticle colloid in which the pH after mixing and stirring is 1.0 (Example 4)

FIG. 2 is a graph showing the particle size distribution of a metal composite oxide microparticle colloid in which the pH after mixing and stirring was 1.0 (Example 4). In this graph, the black diamonds indicate particle size distribution immediately after mixing, the white squares indicate particle size distribution after one day had elapsed after mixing, and the white triangles indicate particle size distribution after seven days had elapsed after mixing. As can be seen from the graph, differing from the metal composite oxide microparticle colloids of Comparative Examples 4 and 5, the metal composite oxide microparticle colloid of Example 4 retained a mean particle diameter of 10 nm or less not only immediately after mixing, but also seven days after mixing.

Table 2 summarizes pH values after mixing and stirring and mean particle diameters immediately after mixing, mean particle diameters seven days after mixing, and evaluation results at both times for metal composite oxide microparticles of Examples 2 to 6 and Comparative Examples 5 to 8. Furthermore, evaluation criteria consisted of an evaluation of O in the case of a mean particle diameter of 10 nm or less and an evaluation of x in the case of a mean particle diameter in excess of 10 nm.

TABLE 2

|  | | Immediately after mixing | | 7 days after mixing | |
| --- | --- | --- | --- | --- | --- |
|  | pH | Mean particle diameter (nm) | Evaluation | Mean particle diameter (nm) | Evaluation |
| Example 2 | 1.5 | 2.2 | O | 2.3 | O |
| Example 3 | 1.2 | 2.3 | O | 2.3 | O |
| Example 4 | 1.0 | 2.3 | O | 2.4 | O |
| Example 5 | 0.8 | 2.2 | O | 2.1 | O |
| Example 6 | 0.5 | 2.3 | O | 2.2 | O |
| Comp. Ex. 5 | 2.0 | 2.0 | O | 44.4 | x |
| Comp. Ex. 6 | 1.8 | 2.3 | O | 42.6 | x |
| Comp. Ex. 7 | 1.6 | 2.2 | O | 12.1 | x |
| Comp. Ex. 8 | 0.3 | 233.4 | x | — | — |

As shown in Table 2, although metal composite oxide microparticle colloids in which the pH after mixing and stirring was 2.0 to 1.6 (Comparative Examples 5 to 7) maintained an average particle diameter of less than 3 nm immediately after mixing, the mean particle diameter exceeded 10 nm seven days after mixing. This suggests that the stability of the metal composite oxide microparticle colloid becomes low at a pH after mixing and stirring of 1.6 or above. In addition, the mean particle diameter immediately after mixing of the metal composite oxide microparticle colloid in which the pH after mixing and stirring was 0.3 (Comparative Example 8) exceeded 200 nm. The colloid of Comparative Example 8 was visually confirmed to form a white precipitate. This white precipitate was confirmed both in the case of having synthesized alumina single nanoparticles so that the pH was 0.3 or lower and in the case of having synthesized ceria-zirconia-yttria composite single nanoparticles so that the pH was 0.3 or lower. Thus, aggregation of PEI was suggested to have occurred resulting in an increase in mean particle diameter under conditions of a pH of 0.3 or lower.

On the other hand, as can be seen from Table 2, metal composite oxide microparticle colloids in which the pH after mixing and stirring was 1.5 to 0.5 (Examples 2 to 6) maintained a mean particle diameter of less than 3 nm both immediately after mixing and seven days after mixing. Thus, the metal oxide composite microparticle colloids of this embodiment were determined to be able to maintain a mean particle diameter of less than 10 nm by adjusting pH so that the pH after stirring and mixing is within the range of 0.5 to 1.5.

While some embodiments of the invention have been illustrated above, it is to be understood that the invention is not limited to details of the illustrated embodiments, but may be embodied with various changes, modifications or improvements, which may occur to those skilled in the art, without departing from the scope of the invention.

The invention claimed is:

1. A method of synthesizing metal composite oxide, comprising:
    adding a dispersant to a ceria composite oxide nanoparticle colloid, wherein a mean particle diameter of the ceria composite oxide nanoparticle colloid to which the dispersant has been added is 10 nm or less;
    adding a dispersant to an alumina nanoparticle colloid, wherein a mean particle diameter of the alumina nanoparticle colloid to which the dispersant has been added is 10 nm or less;
    introducing separately the ceria composite oxide nanoparticle colloid to which the dispersant has been added and the alumina nanoparticle colloid to which the dispersant has been added into a high-speed stifling apparatus;
    synthesizing alumina-ceria composite oxide nanoparticles by allowing the ceria composite oxide nanoparticles and the alumina nanoparticles that have been introduced into the high-speed stifling apparatus to mutually react in a microscopic space; and
    applying a shearing force at a shear rate of $17000\ sec^{-1}$ or more to the alumina-ceria composite oxide nanoparticles.

2. The method according to claim 1, wherein a pH value of a solution containing the alumina-ceria composite oxide nanoparticles to which the shearing force has been applied is within a range of 0.5 to 1.5.

3. The method according to claim 1, wherein a pH value of a solution containing the alumina-ceria composite oxide nanoparticles to which the shearing force has been applied is within a range of 0.5 to 1.2.

4. The method according to claim 1, wherein a pH value of a solution containing the alumina-ceria composite oxide nanoparticles to which the shearing force has been applied is within a range of 0.8 to 1.2.

* * * * *